Dec. 10, 1940.   R. T. BOWLING   2,224,212

DIE HEAD

Filed March 18, 1939

ROBERT T. BOWLING
Inventor

By Herbert E. Smith

Attorney

Patented Dec. 10, 1940

2,224,212

UNITED STATES PATENT OFFICE 2,224,212

DIE HEAD

Robert T. Bowling, Lewiston, Idaho, assignor to Wood Briquettes, Inc., Lewiston, Idaho Application March 18, 1939, Serial No. 262,753

10 Claims. (Cl. 25—11)

My present invention relates to improvements in die heads such as are used in briquetting machines or presses for molding cylindrical briquettes from sawdust, wood shavings, and other fibrous materials, and of the type disclosed in my patent, No. 1,990,631, issued February 12, 1935.

In forming cylindrical briquettes according to my inventions, finely comminuted fibrous material is fed from a hopper to a tapered feed screw which is suitably enclosed within a conical drum having at its forward end a compression chamber. As the screw turns, a pressure upon the material is gradually increased in proportion to the taper of the feed screw and it is laid in the first compression chamber partially compressed with relation to the finished product. Secured to the forward end of the tapered feed screw and revolving therewith is a die head similar to the one disclosed in my Patent No. 1,906,245, issued May 2, 1933. The die head picks up the partially compressed laminated material in the first compression chamber and passes it into the second compression chamber where it is laid up in relatively thin laminations under great pressures to form a solid, cylindrical briquette. The second compression chamber comprises a cylindrical die supported in a revolvable mold wheel. A multiplicity of these dies are spaced around the periphery of the mold wheel and register successively with the feed end of the conical drum adjacent the die head. The pressed material as it leaves the die head is laid in the hollow, cylindrical mold or second compression chamber in a continuous spiral layer of a width equal to the radius of the die head which is, of course, one-half the diameter thereof and of the cylindrical mold.

In operation each die is presented at the feed end of the conical drum with a formed and cooled briquette therein. When the mold is properly indexed a yieldable pressure head is brought into abutment with the end of the briquette remote from the feed end of the die. As the tapered feed screw and die head begins to revolve and extrude the thin laminations of the product into the die or mold, the yielding head is permitted to back away proportionately and permit the finished briquette to be extruded from the die. The pressure maintained on the yielding head is approximately 40,000 pounds per square inch and this pressure, together with the action of the feed screw and the die head compresses the laminations of the fibrous material, being produced, against each other.

The combination of pressure and friction produces great heat and the saps, resins, pitches and other moisture present in the fibrous material are converted into a semi-fluid which thoroughly binds the fibers together when cooled. Experience has taught that a perfect bond can not always be obtained between the spiral laminations to the end that subsequent jarring will cause the laminations to part and the finished briquette to break into two or more pieces.

The problem of firmly cementing or compressing the individual laminations together the adjoining ones has long been sought to be solved.

A briquette that could be formed so that its natural physical structure would tend to secure itself together in one unit and eliminate shearing along the lines of the laminations would be very desirable to the manufacturer during the handling necessary in this stage of production as well as by the user who would find such breakage objectionable.

By the use of the die head disclosed in Patent No. 1,906,245, it was also found that high temperatures encountered caused deterioration of the metal which necessitated shut downs of the machinery while repairs were being effected. It has therefore been deemed highly desirable to provide means whereby the die head can be cooled and thus prolong its durability. In this the cost of production would be decreased and efficiency increased.

It is a primary object of my invention to provide a die head suitable for altering the shape of the laminations in the finished briquette whereby a more perfect and durable briquette will be formed.

Another object of my invention has been to provide such a die head which does not require any changes in the operation or construction of my briquetting machine.

A still further object of my invention has been to provide cooling means for such a die head.

Other objects and advantages of the invention will be apparent during the course of the following description.

My invention consists in certain novel combinations and arrangements of parts as will hereinafter be more fully set forth and claimed.

In the accompanying drawing I have illustrated one complete example of the physical embodiment of my invention wherein the parts are combined and arranged according to the best mode I have thus far devised for the practical application of the principles of my invention, but it will be undertsood that various changes and alterations may be made in the exemplified structure within the scope of my claims without departing from the principles of the invention.

Figure 4:
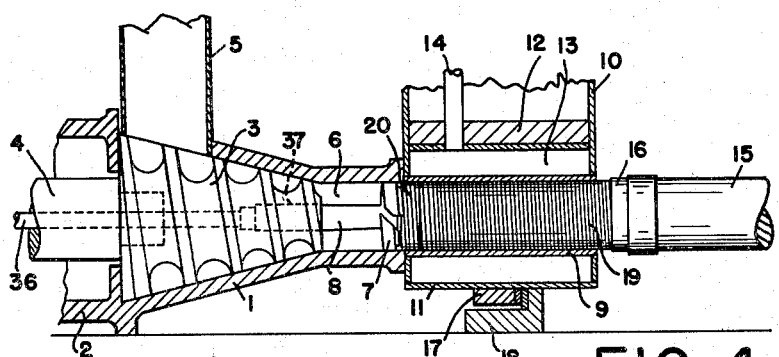
Figure 4 is a vertical sectional view through the briquette-forming section of a briquetting machine of my invention.

Referring now to Figure 4, for the purposes of illustration, I have shown a tapered or conical drum 1 mounted upon the forward end of a bearing box 2 and having in its interior the tapered feed screw 3 which is revolved by means of the tubular feed shaft 4 suitably bearinged and powered. A feed hopper 5 communicates with the interior of the drum 1 and to the screw 3. Forward of the tapered feed screw is a compression chamber 6 formed between the forward end of the feed screw 3 and the die head 7, which die head is supported in advance of the feed screw by means of the spindle 8. A cylindrical die or mold 9 is registered with the feed end of the drum 1 and is supported in a rotary mold wheel 10 having an outer cylindrical member 11 and inner rim 12. A cylindrical passage 13 is formed between the members 11 and 12 and water is fed to this area by means of the tube 14.

A piston stem 15 supports a yielding head 16. An index ring 17 around the outer periphery of the mold wheel 10 registers with a pressure shoe 18 to hold the dies 9 and the wheel 10 in proper alignment. In Figure 4 I show a complete briquette, as 19, partially extruded from the die 9 and a portion of the newly formed briquette 20 being extruded from the die head 7 into the die or mold 9.

Figure 1:
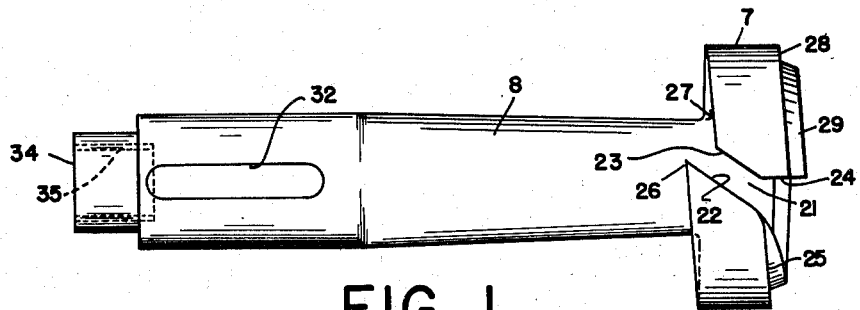
Figure 1 is a side elevation of the die head of my present invention.

In Figure 1 the die head 7, as mounted on its spindle 8, is fully detailed. In effect the head 7 comprises a portion of a thread and has a slot 21, the bounds of which are formed by the inclined wall 22 and the opposed wall 23. This slot extends inwardly from the periphery of the head 7 to the approximate periphery of the spindle 8 at the back of the head, while at the front face of the head the slot is of greater depth and thus extends nearer the center of the disk than at the rear or back face.

Figure 2:
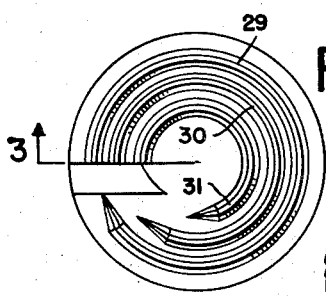
Figure 2 is a front elevation of my die head.
Figure 3:
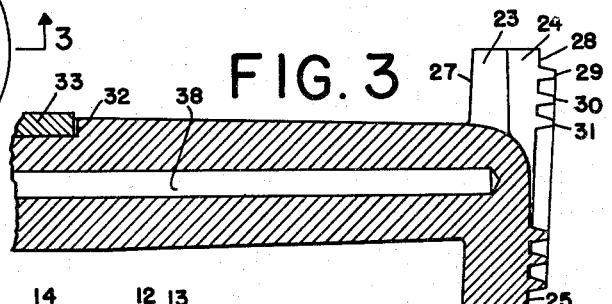
Figure 3 is a sectional view taken on lines 3—3 of Figure 2.

The opposed walls 22 and 23 may be parallel or slightly diverging toward the forward end from the back to the front face of the head and the wall 24 merges away from the wall 23 as it approaches the forward face. The inclined wall 22 merges into the inclined depression 25 of arcuate shape in the front face of the head. At the back face of the head the inclined wall 22 terminates in a cutting edge 26 which extends in a radial direction from the periphery of the head to the periphery of the spindle and behind this cutting edge the back face of the head declines until it reaches the depression 27 at the opposite side of the mouth or entrance of the slot. The depression 25 merges into the face 28 of the die head and is substantially spiral in configuration. Beginning at the junction of the face 28 with the wall 24 I form one or more concentric ribs as 29 which may be tapered or rounding as is best desirable. In Figure 2 an elevational view of the ribs shows three ribs 29, 30, and 31 which extend concentrically around the central longitudinal axis of the die head and terminate in suitable tapers with staggered relation to each other.

In the rear end of the spindle a key-way 32 is provided and a key 33 engaging in a corresponding key-way in the tapered feed screw 3 securely locks the screw 3 and the head 7 together so that they will rotate as one during the operation.

At the rear end of the spindle 8 a boss 34 having interior threads 35 is provided and a threaded retaining tube 36 passing through the interior of the tubular feed shaft 4 and the screw 3 engages the threads 35 and securely draws the die head and its spindle 8 into the opening 37 provided therefor at the forward end of the feed screw. The retaining tube is supplied with water or other fluid for cooling purposes by means of suitable valve connections and this fluid communicates with the interior of the die spindle and the die head through the passage 38.

During the operation of the machine to form briquettes the loose sawdust which is fed through the feed hopper 5 is gradually compressed by the screw 3 into the chamber 6 to the rear of the head 7. The sawdust in this chamber 6 is in the form of relatively thick, loose laminations and, of course, has a hollow in the center where it is formed around the spindle 8. The constantly revolving die head 7 passes or conveys the loose laminations from the chamber 6 through the slot in the form of a ribbon and the layer is continuously "laid" in the second compression chamber or mold cylinder 9.

In the mold 9 the material is compressed to a greater density than in the first compression chamber 6 and this density may be varied by modifying the pressures upon the yielding head 16 offered by the longitudinal movable piston stem 15. The cutting edge 26 of the die head severs the loose layers or laminations in a continuous spiral ribbon. The inclined depression 25 on the forward face of the die head 7 rises to the cam face 28 and terminates at its juncture with a radial edge or wall 24 of the slot.

It will be apparent that the back and front faces of the die head comprise a portion of a single screw thread with a slot as 21 therethrough for the passage of the material and that the front face compresses the spiral ribbon against the briquette 19 which is already present in the mold cylinder 9 and also against the yielding head 16, thus forming a new briquette immediately to the rear of the previously formed and already cooled briquette.

By the addition of the spiral concentric rings 29, 30, and 31 to the spiral face of the die head, I am enabled to distort the cross sectional shape of the ribbon after it has passed through the slot 21 to a corrugated shape in cross section. As the ribbon lamination of sawdust leaves the slot 21 at its juncture with the inclined depression 25, it is bent or turned at an angle to the direction of passage through the slot to approximately the angle of the depression 25. The sloping ends of the concentric rings 29, 30, and 31 gradually increase the pressure on the ribbon and cause it to conform to the rises and depressions that are apparent in the cross section of the head of the die. This manner of distorting the ribbons increases the pressures applied to the yielding head 16. Because of the additional wiping surface presented by the ribbed face the greater radial compression obtained forces the material more tightly against the inner wall of the mold 9 and increases the glazed outer appearance of the briquette.

Figure 5:
Figure 5 is a perspective view partially in section showing a portion of a briquette formed in accordance with the principles of my present invention.

The distortions produced are apparent in the perspective view of Figure 5 and it will be clear that the corrugations lie one upon the other in a manner to present a practically non-shearable briquette.

Briquettes formed by the means of the present application are extremely durable through the handling they must necessarily receive in the usual transportation to the ultimate user and do not have a tendency to deteriorate when stored by breaking or separating into two or more pieces. The use of the concentric rings or ribs on the face of the die head has been the basis of much testing and experimentation which fully substantiates the statements made herein.

By the addition to the die head of the radiation passage in the interior of the spindle 8 I have been enabled to further increase the effectiveness of my briquetting operations by being able to draw off the greater heat produced due to the increased frictional surface of the face of this die head. Water under pressure flows in at a low temperature and flows out at a substantially higher temperature, clearly indicating that heat is being absorbed thereby at the die head and therefore cooling it.

My removable and replaceable die head is preferably constructed of the highest grade steel, such as chrome nickel, and it is customary to coat the outer surface with stellite or other suitable material through the use of an acetylene torch. After the die head and spindle have been properly coated they are then ground to dimension and polished. It should be apparent when necessary that the die head may be readily removed and a new one substituted therefor and drawn into and securely locked in place through the action of the retaining tube which is more clearly disclosed in my Patent No. 1,990,631.

Having thus fully described my invention, what I claim as new and desire to secure by Letters Patent is:

1. In a rotary die-head for briquette machines, the combination of means for cutting a spiral layer from a previously formed mass, means for corrugating said layer, and means for compressing the spiral corrugated layer into a solid cylindrical briquette.

2. In a rotary die-head for briquette machines, the combination of means for cutting a spiral layer from a previously formed mass, and means for simultaneously corrugating and compressing said layer into a solid cylindrical briquette.

3. The combination in a rotary die-head for briquette machines, of front and back spiral faces, said die-head having a transverse groove between said faces, a spindle for securing said die-head to rotating means, and means on the forward spiral face for corrugating material to be compressed.

4. The combination in a rotary die-head for briquette machines, of front and back spiral faces, means for cutting a spiral layer from a previously formed mass, said die-head having a transverse groove between said faces for passing said layer from the rear to the forward face upon rotation of the die-head, and means on the forward spiral face for corrugating material to be compressed.

5. In a rotary die-head for briquette machines, the combination of means for cutting a spiral layer from a previously formed mass, means for corrugating said layer comprising concentric ribs, and means for compressing the spiral corrugated layer into a solid cylindrical briquette.

6. The combination in a rotary die-head for briquette machines, of front and back spiral faces, said die-head having a transverse groove between said faces, a spindle for securing said die-head to rotating means, and means on the forward spiral face for corrugating material to be compressed comprising spiral concentric ribs.

7. The combination in a rotary die-head for briquette machines, of front and back spiral faces, means for cutting a spiral layer from a previously formed mass, said die-head having a transverse groove between said faces for passing said layer from the rear to the forward face upon rotation of the die-head and spiral concentric ribs on the forward spiral face for corrugating material to be compressed.

8. The combination in a rotary die-head for briquette machines, of front and back spiral faces, a cutting edge for severing a spiral layer from a previously formed mass, said die-head having a transverse groove extending from said cutting edge to said front face for passing the spiral layer forward, and spiral concentric ribs on the forward spiral face for corrugating material to be compressed.

9. The combination in a rotary die-head for briquette machines, of front and back spiral faces, said die-head having a transverse groove between said faces, a spindle for securing said die-head to rotating means, said spindle having an axial radiation passage in the interior thereof, and means on the forward spiral face for corrugating material to be compressed.

10. The combination in a rotary die-head for briquette machines, of front and back spiral faces, said die-head having a transverse groove between said faces, and a spindle for securing said die-head to rotating means, said spindle having a radiation passage in the interior thereof.

ROBERT T. BOWLING.